(12) United States Patent
Nishida

(10) Patent No.: US 7,937,577 B2
(45) Date of Patent: May 3, 2011

(54) INFORMATION PROCESSING APPARATUS AND OPERATING SYSTEM DETERMINATION METHOD

(75) Inventor: Tsuyoshi Nishida, Akishima (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 39 days.

(21) Appl. No.: 12/340,002

(22) Filed: Dec. 19, 2008

(65) Prior Publication Data

US 2009/0164768 A1 Jun. 25, 2009

(30) Foreign Application Priority Data

Dec. 21, 2007 (JP) ................................. 2007-331056

(51) Int. Cl.
*G06F 15/177* (2006.01)
(52) U.S. Cl. ................. 713/100; 713/1; 713/2; 713/300
(58) Field of Classification Search .................. 713/1, 2, 713/100, 300
See application file for complete search history.

(56) References Cited

U.S. PATENT DOCUMENTS

| | | | | |
|---|---|---|---|---|
| 6,732,280 | B1 * | 5/2004 | Cheok et al. .................. | 713/300 |
| 6,823,516 | B1 | 11/2004 | Cooper | |
| 7,100,037 | B2 * | 8/2006 | Cooper ............................. | 713/2 |
| 2004/0205730 | A1 * | 10/2004 | Week ............................ | 717/136 |
| 2006/0288197 | A1 * | 12/2006 | Swanson et al. ................... | 713/1 |
| 2007/0157196 | A1 * | 7/2007 | Goicea et al. ................. | 717/174 |
| 2008/0133901 | A1 * | 6/2008 | Nijhawan et al. ................. | 713/2 |
| 2008/0163256 | A1 * | 7/2008 | Khanna et al. ................. | 719/318 |
| 2008/0184247 | A1 * | 7/2008 | Hughes et al. ................ | 718/104 |
| 2008/0244302 | A1 * | 10/2008 | Khatri et al. .................... | 713/502 |
| 2008/0282077 | A1 * | 11/2008 | Kawano et al. .................... | 713/2 |
| 2009/0064132 | A1 * | 3/2009 | Suchy et al. .................. | 717/177 |
| 2009/0064133 | A1 * | 3/2009 | Suchy et al. .................. | 717/177 |

FOREIGN PATENT DOCUMENTS

| | | |
|---|---|---|
| JP | H02-280229 | 11/1990 |
| JP | H02-280229 A | 11/1990 |
| JP | 2007-207074 A | 8/2007 |

OTHER PUBLICATIONS

Hewlett-Packard Corporation, et al., Advanced Configuration and Power Interface Specification, Oct. 10, 2006, Revision 3.0b, pp. 49-53 and pp. 95-105.
Kenichi Adachi, Managing Various PC/AT Resources: PC/AT Power Management and Configuration by ACPI, Part 1, Interface, CQ Publishing Co., Ltd., Jul. 1, 2003, vol. 29, No. 7, pp. 177-189.
An English translation of Notice of Reasons for Rejection mailed by Japan Patent Office for Japanese Patent Application No. 2007-331056 on Apr. 7, 2009.

* cited by examiner

*Primary Examiner* — Abdelmoniem Elamin
(74) *Attorney, Agent, or Firm* — Knobbe, Martens Olson & Bear LLP

(57) ABSTRACT

According to one embodiment, an information processing apparatus includes a determination module provided for an SMI handler of an ACPI compatible Basic Input/Output System (BIOS). The determination module determines, when a system management interrupt (SMI) occurs due to issuance of an Advanced Configuration and Power Interface (ACPI) Enable command by an ACPI compatible operating system, a type of a kernel of the operating system by referring to a CPU STATE MAP area holding a state of a CPU upon occurrence of an SMI.

14 Claims, 5 Drawing Sheets

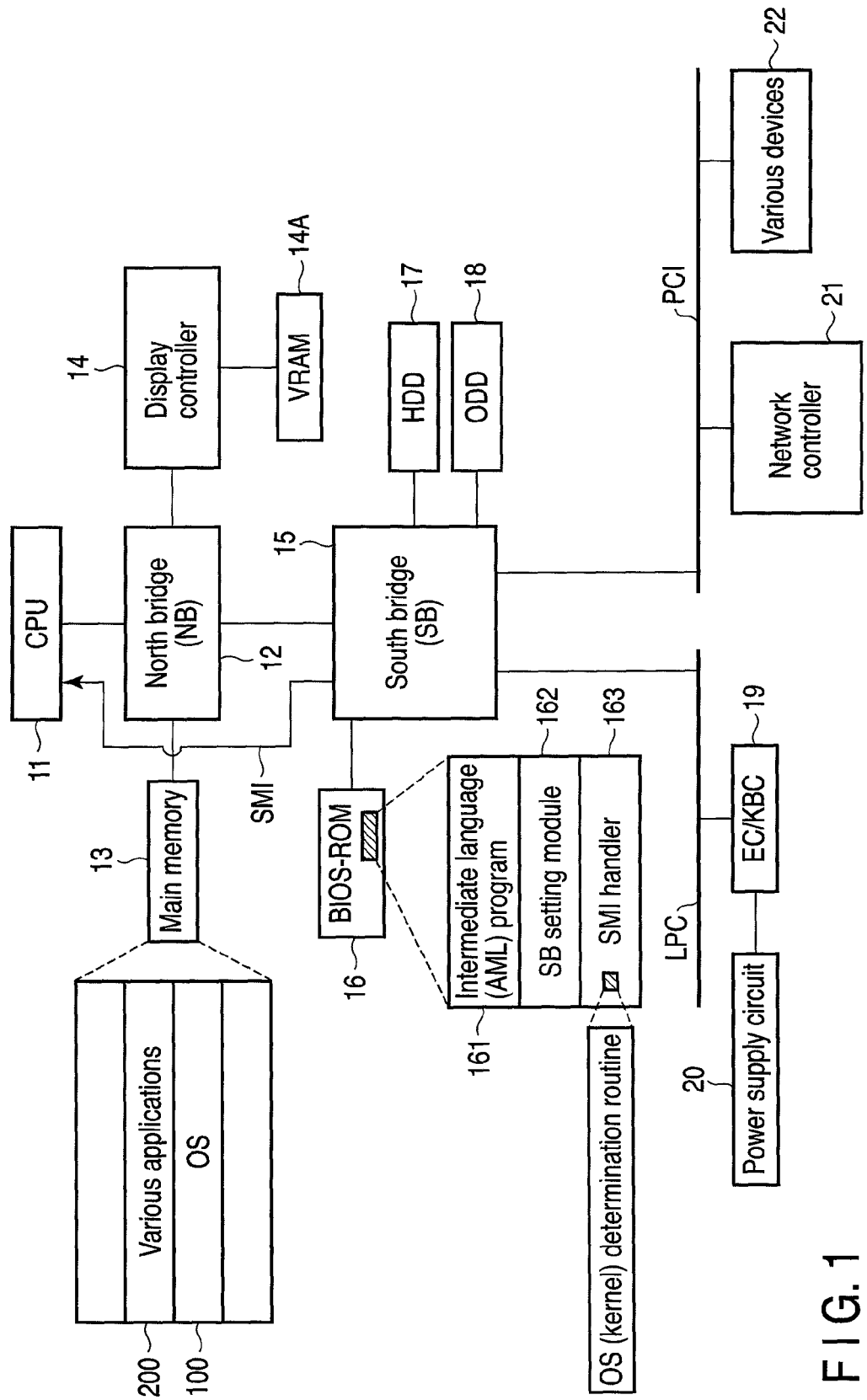
F I G. 1

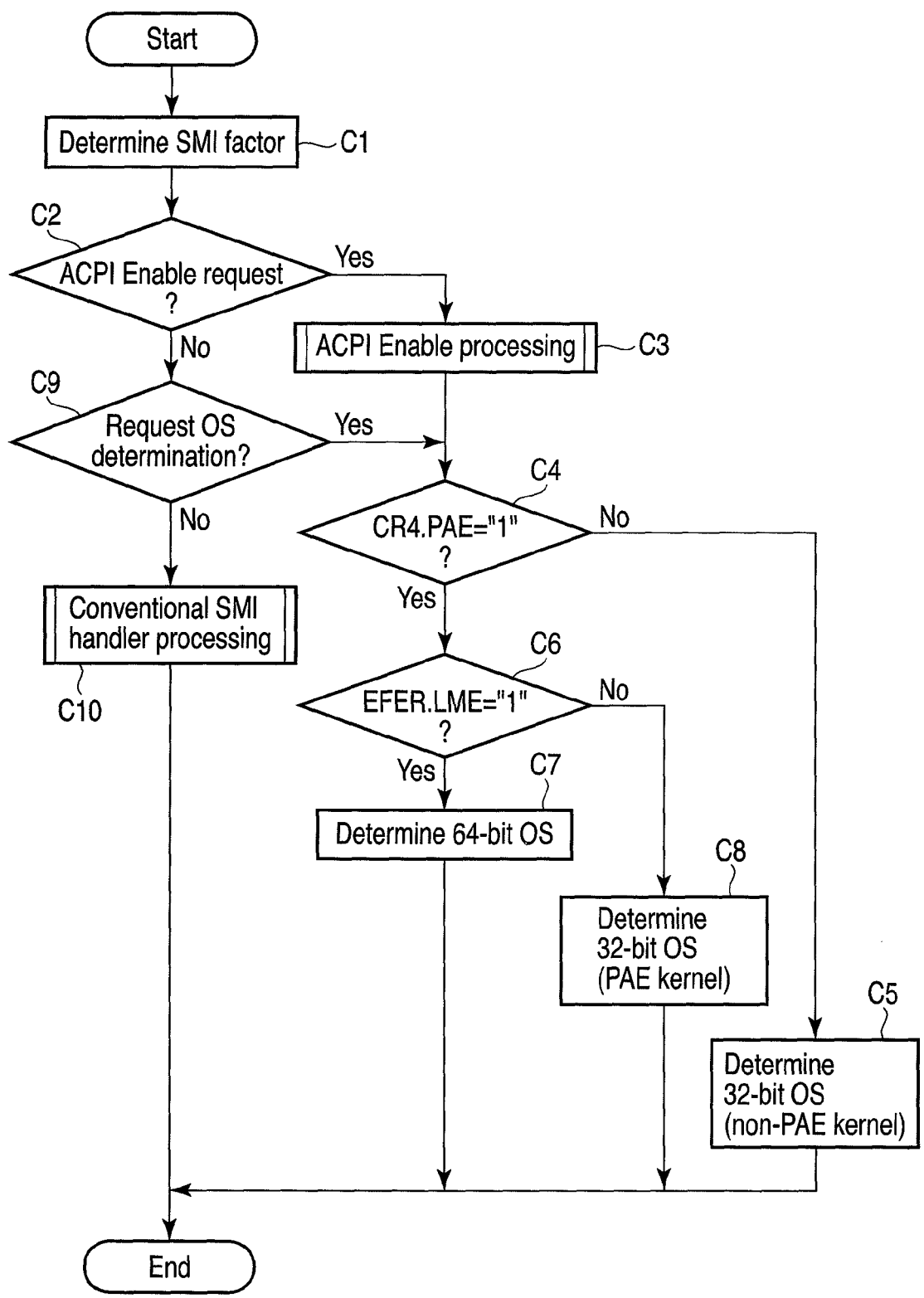
F I G. 6

INFORMATION PROCESSING APPARATUS AND OPERATING SYSTEM DETERMINATION METHOD

CROSS-REFERENCE TO RELATED APPLICATIONS

This application is based upon and claims the benefit of priority from Japanese Patent Application No. 2007-331056, filed Dec. 21, 2007, the entire contents of which are incorporated herein by reference.

BACKGROUND

1. Field

One embodiment of the invention relates to an automatic operating system determination technique suitable for a personal computer on which a 32- or 64-bit operating system can run.

2. Description of the Related Art

In recent years, various types of personal computers such as notebook type computers and desktop type computers have prevailed. In such computers, an operating system (OS) manages the resources, and various application programs including utilities are executed under the control of the OS.

In this way, the OS plays an important role in the personal computer. Various techniques for dealing with the OS have been proposed (see, e.g., Jpn. Pat. Appln. KOKAI Publication No. 2-280229).

To manage the resources, the OS inquires of a Basic Input/Output System (BIOS) about the resources of the personal computer, i.e., the resources to be managed by the OS (a resource report). The OS then manages the resources on the basis of the contents of the resource report from the BIOS.

These days, a 64-bit OS which can use a memory area including more than 4 Gbytes has become more popular than a 32-bit OS which can use a memory area including at most 4 Gbytes. Along with this trend, the capacity of an expansion memory is increasing.

A user sets the OS running on the personal computer as a 32- or 64-bit OS by using, e.g., a utility program. The BIOS generally makes a resource report to the OS on the basis of the user setting. Assume that the user sets the OS as a 32-bit OS although it is a 64-bit OS. In this case, even if the capacity of the internal memory of the computer is much larger than 4 Gbytes, the BIOS sends, to the OS, a resource report representing a memory area with 4 Gbytes with which a 32-bit OS can deal.

To the contrary, assume that the user sets the OS as a 64-bit OS although it is a 32-bit OS. If the capacity of the internal memory of the computer is over 4 Gbytes, the BIOS sends, to the OS, a resource report representing a memory area with over 4 Gbytes with which a 32-bit OS cannot deal. This may cause a malfunction of the personal computer.

For this reason, there has been a strong demand for the BIOS to have a mechanism for automatically determining whether the OS running on the personal computer is a 32- or 64-bit OS.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is an exemplary block diagram showing the system configuration of an information processing apparatus according to an embodiment of the invention;

FIG. 6 is an exemplary flowchart showing the sequence of an SMI handler of the BIOS of the information processing apparatus according to the second embodiment;

DETAILED DESCRIPTION

Figures 2, 3:
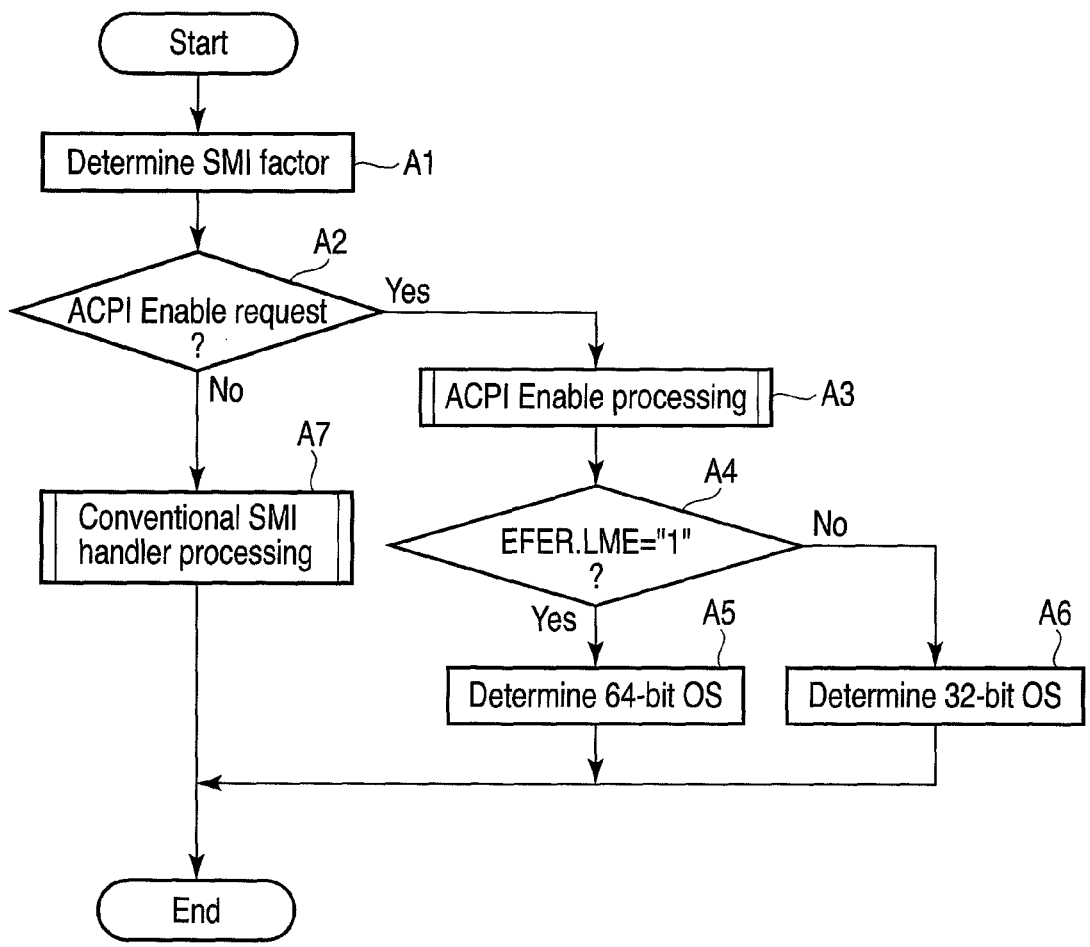
FIG. 2 is an exemplary view showing a table for listing, by operating system types, pieces of information stored in CPU STATE MAP.
FIG. 3 is an exemplary flowchart showing the operation procedure of automatic operating system determination processing by a BIOS executed on an information processing apparatus according to the first embodiment.

Various embodiments according to the invention will be described hereinafter with reference to the accompanying drawings. In general, according to one embodiment of the invention, an information processing apparatus includes a determination module provided for an SMI handler of an ACPI compatible Basic Input/Output System (BIOS). The determination module determines, when a system management interrupt (SMI) occurs due to issuance of an Advanced Configuration and Power Interface (ACPI) Enable command by an ACPI compatible operating system, a type of a kernel of the operating system by referring to a CPU STATE MAP area holding a state of a CPU upon occurrence of an SMI.

FIG. 1 is an exemplary block diagram showing the system configuration of an information processing apparatus according to the embodiment. The information processing apparatus is implemented as a personal computer such as a notebook type computer or desktop type computer.

As shown in FIG. 1, the computer includes a CPU 11, a north bridge 12, a main memory 13, a display controller 14, a video memory (VRAM) 14A, a south bridge 15, a BIOS-ROM 16, a hard disk drive (HDD) 17, an optical disk drive (ODD) 18, an embedded controller/keyboard controller (EC/KBC) 19, a power supply circuit 20, a network controller 21, and various devices 22.

The CPU 11 is a processor which controls the operation of the computer. The CPU 11 executes an operating system (OS) 100 and various application programs 200 including utility software operating under the control of the OS 100, which are loaded from the HDD 17 to the main memory 13. The CPU 11 also executes a BIOS stored in the BIOS-ROM 16. The BIOS itself stored in the BIOS-ROM 16 may be referred to as a BIOS 16 hereinafter. The BIOS 16 is a program for controlling the hardware. The OS 100 and BIOS 16 executed by the CPU 11 are compatible with Advanced Configuration and Power Interface (ACPI) defined for power control and hot-swap controls of peripheral devices.

The north bridge 12 is a bridge device which interconnects a local bus of the CPU 11 and the south bridge 15. The north bridge 12 includes a function of executing communications with the display controller 14 via a bus. The north bridge 12 also incorporates a memory controller used to make access control of the main memory 13. The display controller 14 performs driving control of a display device built into the computer or externally connected to the computer.

The south bridge 15 is a controller which controls the various devices 22 on a PCI bus. The south bridge 15 directly connects to the BIOS-ROM 16, HDD 17, and ODD 18, and includes a function of controlling those units. Furthermore, the south bridge 15 includes a function of supplying, to the CPU 11, a signal notifying that a system management interrupt (SMI) (to be described later) occurs.

The HDD 17 is a storage device which stores various software programs and data. The ODD 18 is a drive unit for driving storage media such as a Compact Disc (CD) and Digital Versatile Disc (DVD).

The EC/KBC 19 is a one-chip microcomputer on which an embedded controller for power management and a keyboard controller for controlling a keyboard and touchpad are integrated. The EC/KBC 19 cooperates with the power supply circuit 20 to supply power from a battery or external AC power supply to each unit and control power supply. The network controller 21 is a communication apparatus which communicates with an external network such as the Internet.

The OS 100 manages the resources of the computer including the above described system configuration. The BIOS 16 makes a resource report to the OS 100. Assume that either a 32-bit OS or 64-bit OS can run on the computer. That is, the BIOS 16 needs to make a 64-bit OS resource report for a 64-bit OS, and a 32-bit OS resource report for a 32-bit OS. The BIOS 16 of the computer includes a mechanism for automatically determining whether the OS 100 is a 64- or 32-bit OS. This will be described in detail below.

First, (1) Overview of SMI, (2) Overview of Long Mode, and (3) Overview of Operation of ACPI OS are given for the sake of easy understanding of the following description.

(1) Overview of SMI

An SMI is an interrupt for processing an interrupt factor which the BIOS must process even when the OS is in an active state. When an SMI occurs, the CPU saves the state of itself including a general register in an area called CPU STATE MAP, and calls an SMI handler of the BIOS. CPU STATE MAP includes information pertaining to the operation mode of the CPU. It is possible to determine based on the information whether the OS in an active state is a 64-bit OS or not. When the SMI handler ends, the CPU returns to the operation mode in CPU STATE MAP, and restarts the processing before the SMI occurs.

(2) Overview of Long Mode

A CPU with the Intel 64 or AMD 64 architecture has an operation mode called a long mode (IA-32e mode). It is possible to determine whether the operation mode of the CPU is the long mode or not by referring to registers called extended feature enable MSR (EFER) and CR4 registers.

A 64-bit OS (x64 edition) uses this long mode, while a 32-bit OS does not use it. It is therefore possible to determine whether the OS in an active state is a 64-bit OS by checking whether the operation mode of the CPU is the long mode.

(3) Overview of Operation of ACPI OS

The BIOS provides a program described in an intermediate language (ACPI Machine Language [AML]) for an ACPI OS. The ACPI OS notifies, by sending an ACPI Enable command, the BIOS that the ACPI OS will activate, and thereafter executes the program while interpreting the AML by using an interpreter (OSPM) of the OS itself.

Since an SMI occurs due to issuance of the ACPI Enable command, the BIOS detects the start of the ACPI OS in the SMI handler.

First Embodiment

The first embodiment of automatic determination of an OS 100 by a BIOS 16 of a computer will be described first in consideration of the above "Overview of SMI", "Overview of Long Mode", and "Overview of Operation of ACPI OS".

As shown in FIG. 1, the BIOS 16 includes an intermediate language program 161 (to be provided for the OS 100), SB setting module 162, and SMI handler 163.

The intermediate language program 161 holds a table for managing information, such as that representing "write a value yy at an address xx in an I/O address space (assigned to a south bridge 15)", to generate a target SMI. On the other hand, the SB setting module 162 sets the south bridge 15 to "supply to a CPU 11, when the value yy is written at the address xx in the I/O address space (assigned to the south bridge), a signal notifying that an SMI has occurred". When SMIs which can occur by cooperation of the intermediate language program 161 and SB setting module 162 actually occur, the SMI handler 163 executes processes corresponding to respective SMI factors.

An OS determination routine is provided for the SMI handler 163. The computer automatically determines using the OS determination routine whether the OS 100 is a 64- or 32-bit OS. FIG. 2 shows a table for listing, by OS types, pieces of information stored in CPU STATE MAP.

As described in "Overview of SMI", when an SMI occurs, the CPU 11 saves the state of itself including a general register in an area called CPU STATE MAP. If the OS 100 is a 64-bit OS, the operation mode of the CPU 11 at this time is the long mode as explained in "Overview of Long Mode". The value of the LME bit of the EFER register is set to "1" for the long mode. That is, it is possible to determine by referring to the value of the LME bit of the EFER register whether the OS 100 is a 64-bit OS.

As described in "Overview of Operation of ACPI OS", the OS 100 notifies the BIOS 16 of activation of an ACPI OS by sending an ACPI Enable command. An SMI occurs when the ACPI Enable command is issued. When an SMI occurs due to the ACPI Enable command, the OS determination routine of the SMI handler 163 refers to the value of the LME bit of the EFER register and automatically determines whether the OS 100 is a 64-bit OS. After that, upon reception of a resource report request from the OS 100, the BIOS 16 appropriately makes a 64- or 32-bit OS resource report on the basis of the determination result.

FIG. 3 is an exemplary flowchart showing the operation procedure of automatic determination of the OS 100 by the BIOS 16 executed on the computer.

When an SMI occurs, the SMI handler 163 of the BIOS 16 determines an SMI factor (block A1). If the SMI factor is an ACPI Enable command (YES in block A2), the SMI handler 163 executes the requested ACPI Enable processing (block A3), and then refers to the value of the LME bit of the EFER register within CPU STATE MAP (by using the OS determination routine) (block A4).

If the value of the LME bit of the EFER register is "1" (YES in block A4), the SMI handler 163 (the OS determination routine of itself) determines that the OS 100 is a 64-bit OS (block A5); otherwise (NO in block A4), it determines that the OS 100 is a 32-bit OS (block A6).

If the SMI factor is not an ACPI Enable command (NO in block A2), the SMI handler 163 executes the requested conventional handler processing (block A7).

In this way, the computer of the first embodiment implements the automatic determination of the OS 100 by the BIOS 16.

Second Embodiment

The second embodiment of automatic determination of an OS 100 by a BIOS 16 on a computer will now be explained. In the second embodiment, kernel determination of the OS 100 will also be described.

Figure 4:
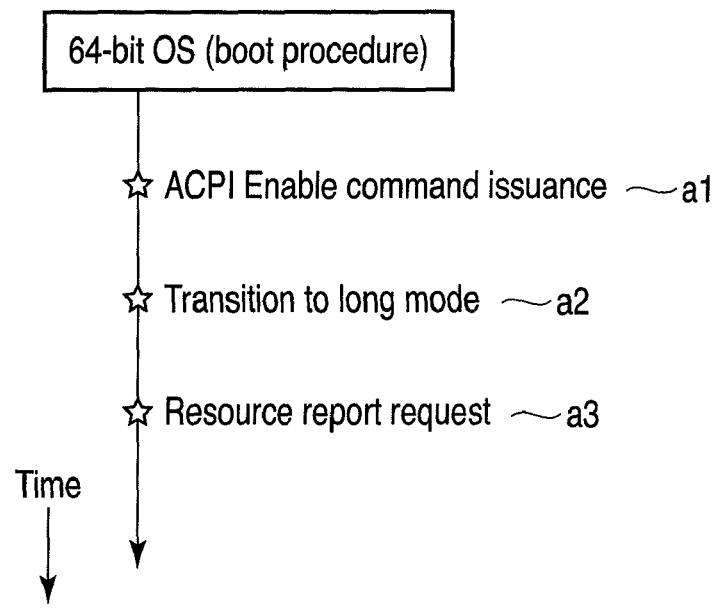
FIG. 4 is an exemplary timing chart showing the boot procedure of a 64-bit operating system in which transition to a long mode is made after an ACPI enable command is issued.

As shown in FIG. 4, assume that in booting a 64-bit OS transition to the long mode (a2) is made after ACPI Enable command issuance (a1). In this case, when an SMI occurs due to an ACPI Enable command, an SMI handler 163 determines that the OS 100 is a 32-bit OS. As a result, a 32-bit OS resource report (a3) is made for the 64-bit OS. In general, no OS actually employs such boot procedure. To be on the safe side, however, in the second embodiment, there is provided a mechanism for determining an OS so that an appropriate resource report can be made even in such situation.

For this purpose, a procedure for generating an SMI due to "an OS determination request" is described in an initialization processing routine (_INI method of ACPI) of an intermediate language program 161 provided for the OS 100 by the BIOS 16, i.e., in a method to be executed first by the OSPM of the OS 100. When an SMI occurs due to "an OS determination request", the SMI handler 163 executes automatic determination of the OS 100 by using the OS determination routine.

Since the initialization processing routine is considered to be executed after transition to the long mode is made, it is impossible to mistake a 64-bit OS for a 32-bit OS. That is, even in the above described situation, it is possible to make an appropriate resource report.

Figure 5:
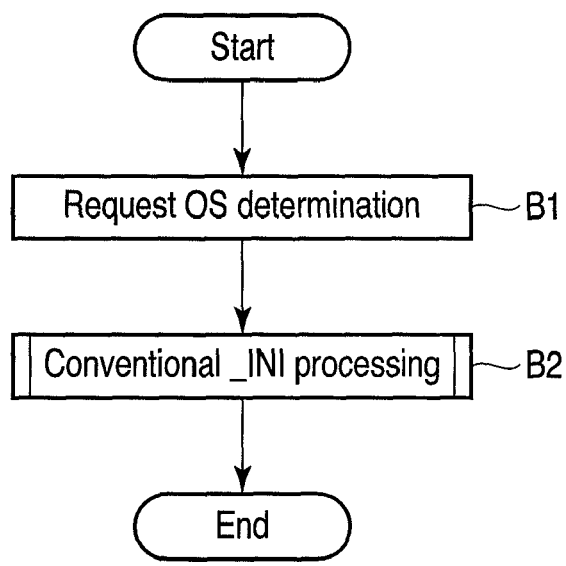
FIG. 5 is an exemplary flowchart showing the sequence of an initialization processing routine of an intermediate language program which is provided for an operating system by a BIOS of an information processing apparatus according to the second embodiment.

The operation procedure of the automatic determination of the OS 100 by the BIOS 16 executed on the computer of the second embodiment will now be explained with reference to FIG. 5 and FIG. 6. FIG. 5 shows the sequence of the initialization processing routine of the intermediate language program 161 provided for the OS 100 by the BIOS 16. FIG. 6 shows the sequence of the SMI handler 163 of the BIOS 16.

The OS 100 which has issued an ACPI Enable command and notified the BIOS of activation of an ACPI OS executes the initialization processing routine shown in FIG. 5 while interpreting, by using its own OSPM, the intermediate language program 161 provided by the BIOS 16.

That is, the OS 100 generates an SMI due to "an OS determination request" (block B1), and then executes a conventional initialization processing (block B2).

On the other hand, when an SMI occurs, the SMI handler 163 determines an SMI factor (block C1). If the SMI factor is an ACPI Enable command (YES in block C2), the SMI handler 163 executes the requested ACPI Enable processing (block C3), and then refers to the value of the PAE Enable bit of the CR4 register and the value of the LME bit of the EFER register within CPU STATE MAP (by using the OS determination routine) (blocks C4 and C6). Whether the operation mode of the CPU is the long mode, i.e., whether the OS is a 64-bit OS can be determined in accordance with whether the LME bit of the EFER register is "1" (as shown in the flowchart of FIG. 3 in the first embodiment). In the second embodiment, whether the value of the PAE Enable bit of the CR4 register is "1" or "0" is also checked to determine whether the OS 100 is a 64-bit OS or not. As shown in FIG. 2, the value of the PAE Enable bit is set to "0" for a non PAE kernel. Since a 64-bit OS has only a PAE kernel, if the value of the PAE Enable bit is not "1", the OS 100 is obviously not a 64-bit OS.

If the value of the PAE Enable bit is not "1" (NO in block C4), the SMI handler 163 (the OS determination routine of itself) determines that the OS 100 is a 32-bit OS (non PAE kernel) at this stage (block C5).

Subsequently, if the value of the LME bit of the EFER register is "1" (YES in block C6), the SMI handler 163 (the OS determination routine of itself) determines that the OS 100 is a 64-bit OS (block C7); otherwise (NO in block C6), it determines that the OS 100 is a 32-bit OS (PAE kernel) (block C8).

If the SMI factor is "an OS determination request" (NO in block C2 and YES in block C9), the SMI handler 163 also executes processes in blocks C4 to C8, i.e., the automatic OS determination processing. With this operation, the automatic OS determination processing is always performed in executing the initialization processing routine of the intermediate language program 161. If the SMI factor is neither an ACPI Enable command nor "an OS determination request" (NO in block C9), the SMI handler 163 executes the requested conventional handler processing (block C10).

As described above, the computer of the second embodiment implements the automatic determination of the OS 100 by the BIOS 16.

Figures 7, 8:
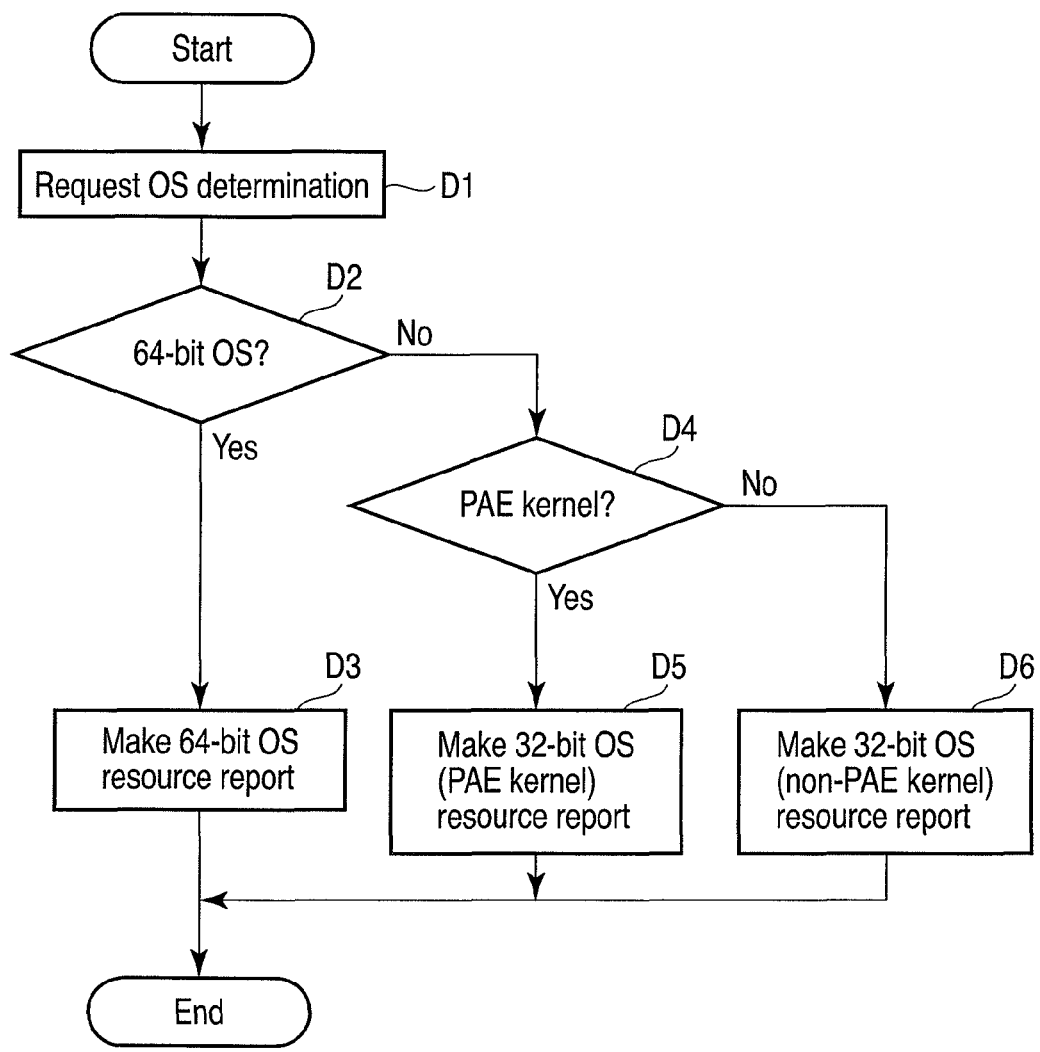
FIG. 7 is an exemplary flowchart showing the operation procedure of the BIOS when it receives a resource report request from the operating system of the information processing apparatus according to the second embodiment.
FIG. 8 is an exemplary view showing setup (a setup screen) presented by a BIOS of an information processing apparatus according to the third embodiment.

A case has been explained wherein the mechanism for preventing a mistake which can be made when transition to the long mode is made after ACPI Enable command issuance as shown in FIG. 4 is implemented by generating an SMI due to "an OS determination request" in the initialization processing routine of the intermediate language program 161. As another example, however, the mechanism can also be implemented when the BIOS 16 generates an SMI due to "an OS determination request" upon reception of a resource report request from the OS 100. FIG. 7 is an exemplary flowchart showing the operation procedure of the BIOS 16 upon reception of a resource report request from the OS 100.

Upon reception of a resource report request from the OS 100, the BIOS 16 generates an SMI due to "an OS determination request" (block D1), and causes the SMI handler 163 to execute the automatic OS determination processing shown in FIG. 6. After that, the BIOS 16 makes a 64-bit OS resource report for a 64-bit OS (YES in block D2, and block D3). On the other hand, in the case of a 32-bit OS (NO in block D2, and block D4), the BIOS 16 makes a 32-bit OS (PAE kernel) resource report for a PAE kernel (YES in block D4, and block D5), and a 32-bit OS (non PAE kernel) resource report for a non PAE kernel (NO in block D4, and block D6).

Note that only one of a mechanism for generating an SMI due to "an OS determination request" in the initialization processing routine of the intermediate language program 161 and that for generating an SMI due to "an OS determination request" upon reception of a resource report request is not necessarily incorporated. Both of them may be incorporated (although the processing becomes redundant since a determination result obtained from the mechanism for generating an SMI due to "an OS determination request" in the initialization processing routine of the intermediate language program 161 is updated with a determination result obtained from the mechanism for generating an SMI due to "an OS determination request" upon reception of a resource report request).

Third Embodiment

The third embodiment of automatic determination of an OS 100 by a BIOS 16 on a computer will now be described.

The BIOS generally includes a function called setup which presents to a user a screen for setting an operation environment. In the third embodiment, the BIOS 16 presents a setup screen like that shown in FIG. 8. That is, in addition to options (b2 and b3) for setting whether the OS 100 is a 32- or 64-bit OS, there is newly provided an option (b1) for causing the BIOS 16 to automatically determine the OS. If the option (b1) for automatic determination is selected on the setup screen, the BIOS 16 generates an SMI due to "an OS determination request", explained in the second embodiment, for example.

With this setup screen, it is possible to appropriately make a 64-bit OS resource report for a 64-bit OS and a 32-bit OS resource report for a 32-bit OS without bothering the user.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information processing apparatus comprising:
    a determination module configured to determine a type of a kernel of the operating system by referring to a CPU STATE MAP area configured to hold a state of a CPU upon occurrence of a system management interrupt (SMI) when SMI occurs due to issuance of an Advanced Configuration and Power Interface (ACPI) Enable command by an ACPI compatible operating system,
    the determination module configured for use with an SMI handler of an ACPI compatible Basic Input/Output System (BIOS).

2. The information processing apparatus of claim 1, wherein the determination module is configured to determine whether the operating system is either a 32-bit operating system or a 64-bit operating system by determining whether the kernel of the operating system is a 32-bit kernel or 64-bit kernel.

3. The information processing apparatus of claim 2, wherein the determination module is configured to determine whether the operating system is the 32-bit operating system or the 64-bit operating system based on a value of a Long Mode Enable (LME) bit of an extended feature enable register (MSR_EFER) in the CPU STATE MAP area.

4. The information processing apparatus of claim 2, further comprising:
    an initialization processing module of a program for generating the SMI in order to request a plurality of processes to the ACPI compatible BIOS, the program being provided for the ACPI compatible operating system by the ACPI compatible BIOS, comprising a procedure for generating an SMI due to a determination request of the ACPI compatible operating system, wherein
    the determination module is configured to determine whether the operating system is either the 32-bit operating system or the 64-bit operating system based on a value of a Physical Address Extensions (PAE) Enable bit of a control register 4 (CR4) register and a value of an LME bit of an extended feature enable register (EFER) in the CPU STATE MAP area, when the SMI occurs due to the determination request.

5. The information processing apparatus of claim 4, wherein the program for generating the SMI in order to request the plurality of processes to the ACPI compatible BIOS provided for the ACPI compatible operating system by the ACPI compatible BIOS is described in an intermediate language (AML: ACPI Machine Language).

6. The information processing apparatus of claim 2, wherein:
    the ACPI compatible BIOS comprises a module configured to cause the ACPI compatible operating system to generate the SMI due to a determination request of the ACPI compatible operating system, when a resource report of the information processing apparatus is requested, and
    the determination module is configured to determine whether the operating system is the 32-bit operating system or the 64-bit operating system based on a value of a PAE Enable bit of a CR4 register and a value of an LME bit of an EFER register in the CPU STATE MAP area, when the SMI occurs due to the determination request.

7. The information processing apparatus of claim 2, wherein:
    the ACPI compatible BIOS comprises a setup module configured to present a selection screen for selecting whether the ACPI compatible operating system is either a 32-bit operating system or 64-bit operating system, the selection screen comprising an option for automatically determining the ACPI compatible operating system,
    the setup module has a module configured to cause the ACPI compatible operating system to generate the SMI due to a determination request of the ACPI compatible operating system when the option for automatically determining the ACPI compatible operating system is selected on the selection screen, and
    the determination module is configured to determine whether the operating system is a 32-bit operating system or a 64-bit operating system based on a value of an LME bit of an EFER register in the CPU STATE MAP area, when the SMI is generated due to the determination request.

8. An operating system determination method for an information processing apparatus on which an ACPI compatible operating system and an ACPI compatible BIOS are configured to run, the method comprising:
    determining by the ACPI compatible BIOS using an SMI handler, a type of a kernel of the operating system by referring to a CPU STATE MAP area configured to hold a state of a CPU upon occurrence of the SMI, when an SMI occurs due to issuance of an ACPI Enable command by the ACPI compatible operating system.

9. The operating system determination method of claim 8, wherein determining whether the operating system is a 32-bit operating system or a 64-bit operating system is based on determining whether the kernel of the operating system is a 32-bit kernel or a 64-bit kernel.

10. The operating system determination method of claim 9, wherein determining whether the operating system is the 32-bit operating system or the 64-bit operating system is based on a value of an LME bit of an EFER register in the CPU STATE MAP area.

11. The operating system determination method of claim 9, further comprising:
    initializing in a program for generating the SMI in order to request a plurality of processes to the ACPI compatible BIOS, the program being provided for the ACPI compatible operating system by the ACPI compatible BIOS, comprising a procedure for generating an SMI due to a determination request of the ACPI compatible operating system, wherein the determining further comprises determining whether the operating system is either a 32-bit operating system or 64-bit operating system based on a value of a PAE Enable bit of a CR4 register and a value of an LME bit of an EFER register in the CPU STATE MAP area, when the SMI occurs due to the determination request.

12. The operating system determination method of claim 11, wherein the program for generating the SMI in order to request the plurality of processes to the ACPI compatible BIOS provided for the ACPI compatible operating system by the ACPI compatible BIOS is described in an intermediate language.

13. The operating system determination method of claim 9, further comprising causing the ACPI compatible operating system to generate the SMI due to a determination request of the ACPI compatible operating system, when a resource report of the information processing apparatus is requested by the ACPI compatible BIOS, wherein the determining further comprises determining whether the operating system is a 32-bit operating system or a 64-bit operating system based on a value of a PAE Enable bit of a CR4 register and a value of an LME bit of an EFER register in the CPU STATE MAP area, when the SMI is generated due to the determination request.

14. The operating system determination method of claim 9, further comprising:

presenting a selection screen for selecting whether the ACPI compatible operating system is a 32-operating system or a 64-bit operating system, the selection screen comprising an option for automatically determining the ACPI compatible operating system by the ACPI compatible BIOS; and causing the ACPI compatible operating system to generate the SMI due to a determination request of the ACPI compatible operating system when the option for automatically, determining the ACPI compatible operating system is selected on the selection screen by the ACPI compatible BIOS, wherein the determining further comprises determining whether the operating system is a 32-bit operating system or a 64-bit operating system based on a value of an LME bit of an EFER register in the CPU STATE MAP area when the SMI occurs due to the determination request.

* * * * *